United States Patent
Toda et al.

(10) Patent No.: US 10,753,399 B2
(45) Date of Patent: Aug. 25, 2020

(54) ROLLING BEARING DEVICE

(71) Applicant: JTEKT CORPORATION, Chuo-ku, Osaka-shi (JP)

(72) Inventors: Takuya Toda, Kashiwara (JP); Hitoshi Toya, Kashiwara (JP); Shingo Onishi, Yao (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 16/512,457

(22) Filed: Jul. 16, 2019

(65) Prior Publication Data
US 2020/0025244 A1 Jan. 23, 2020

(30) Foreign Application Priority Data
Jul. 17, 2018 (JP) ................... 2018-134038

(51) Int. Cl.
*F16C 33/66* (2006.01)
*F16C 19/38* (2006.01)
*F16C 33/80* (2006.01)
*F16C 33/78* (2006.01)

(52) U.S. Cl.
CPC ........ *F16C 33/6666* (2013.01); *F16C 19/386* (2013.01); *F16C 33/6685* (2013.01); *F16C 33/782* (2013.01); *F16C 33/80* (2013.01)

(58) Field of Classification Search
CPC .............. F16C 33/6666; F16C 33/6685; F16C 33/7813; F16C 33/782; F16C 33/7826; F16C 33/7873; F16C 33/80
See application file for complete search history.

(56) References Cited

U.S. PATENT DOCUMENTS

| 3,572,379 | A | * | 3/1971 | Popa | F16K 15/147 |
| | | | | | 137/849 |
| 6,845,986 | B2 | * | 1/2005 | Hood | F16C 33/765 |
| | | | | | 277/409 |
| 7,614,795 | B2 | * | 11/2009 | Adachi | B60B 27/00 |
| | | | | | 384/484 |
| 8,360,651 | B1 | * | 1/2013 | Fetty | F16C 33/80 |
| | | | | | 384/481 |

(Continued)

FOREIGN PATENT DOCUMENTS

| DE | 4329398 | * | 7/1993 |
| JP | 2002266876 | * | 9/2002 |
| JP | 2010-030380 A | | 2/2010 |

*Primary Examiner* — James Pilkington
(74) *Attorney, Agent, or Firm* — Oliff PLC (57) ABSTRACT

A rolling bearing device includes a rolling bearing partially submerged in lubricating oil stored in an oil pocket provided in a vertically lower portion of a housing to a level corresponding to a part of an annular space, an annular shielding member, and an annular seal component. The shielding member has an oil drain portion for drainage of the lubricating oil in the annular space to the outside of the rolling bearing at a vertical level above an oil level of the lubricating oil stored in the oil pocket when the rotary shaft is stationary. The oil drain portion has an inclined groove having an inclined surface inclined away from the rolling bearing and an opening provided in an outer end portion at a distal end of the inclined surface. The inclined groove is tapered toward a vertical top of the shielding member when viewed in the axial direction.

2 Claims, 9 Drawing Sheets

(56) References Cited

U.S. PATENT DOCUMENTS

| | | | |
|---|---|---|---|
| 8,991,829 B2* | 3/2015 | Lattime | F16J 15/3256 277/409 |
| 2009/0084632 A1* | 4/2009 | Homan | F16C 33/726 184/5.1 |

* cited by examiner

ROLLING BEARING DEVICE

INCORPORATION BY REFERENCE

The disclosure of Japanese Patent Application No. 2018-134038 filed on Jul. 17, 2018 including the specification, drawings and abstract, is incorporated herein by reference in its entirety.

BACKGROUND OF THE INVENTION

1. Field of the Invention

The invention relates to a rolling bearing device.

2. Description of Related Art

Known examples of a bearing device that rotatably supports a railway axle include a rolling bearing device of what is typically referred to as an oil bath type that performs lubrication by submerging a part of a rolling bearing that rotatably supports an end portion of the axle in lubricating oil stored in an oil pocket provided in a lower portion of a housing (see Japanese Patent Application Publication No. 2010-30380 (JP 2010-30380 A), for example).

Efforts to increase operation speeds of railway rolling stocks have been made in recent years. The increase in operation speeds brings about the following problem to such a rolling bearing device of the oil bath type. An axle rotating at a high speed causes the rolling bearing to vigorously agitate lubricating oil, leading to a large temperature rise of the rolling bearing device.

SUMMARY OF THE INVENTION

An object of the invention is to reduce a temperature rise of a rolling bearing device caused by agitation of lubricating oil.

According to an aspect of the invention, a rolling bearing device includes a rolling bearing that is housed in a housing and supports a rotary shaft such that the rotary shaft is rotatable about a horizontal axis relative to housing. The rolling bearing includes a plurality of inner rings fixed to the rotary shaft, an outer ring fixed to the housing, and a plurality of rolling elements disposed in an annular space between the inner rings and the outer ring. The rolling bearing is partially submerged in lubricating oil stored in an oil pocket provided in a vertically lower portion of the housing to a level corresponding to a part, in a circumferential direction, of the annular space. The rolling bearing device includes an annular shielding member and an annular seal component. The shielding member includes an outer circumferential portion fixed to at least one of the housing, a member fixed to the housing, and the outer ring and externally covers the annular space in an axial direction. The annular seal component is fixed to at least one of the rotary shaft, a member fixed to the rotary shaft, and the inner rings and reduces entry of the lubricating oil into the annular space from the oil pocket by forming a labyrinth seal between an inner circumferential portion of the shielding member and the annular seal component. The shielding member has an oil drain portion for drainage of the lubricating oil in the annular space to the outside of the rolling bearing. The oil drain portion is provided at a vertical level above an oil level of the lubricating oil stored in the oil pocket when the rotary shaft is stationary. The oil drain portion has an inclined groove and an opening. The inclined groove has an inclined surface inclined away front the rolling bearing. The opening is provided in an outer end portion at a distal end of the inclined surface. The inclined groove is tapered toward a vertical top of the annular shielding member when viewed in the axial direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
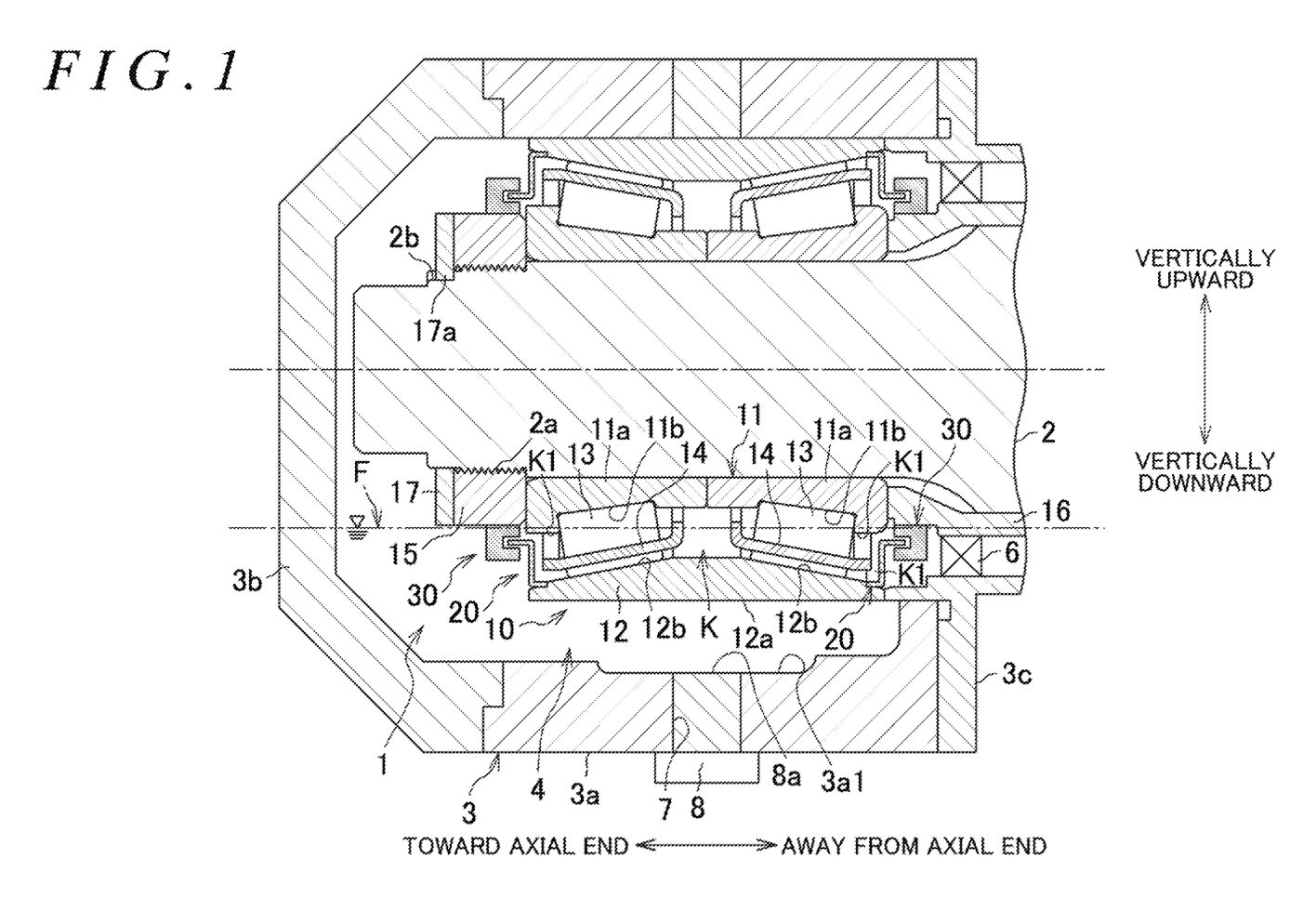
FIG. 1 is a sectional view illustrating a rolling bearing device according to an embodiment of the invention.

FIG. 1 is a longitudinal section profile illustrating a rolling bearing device 1 according to an embodiment of the invention. The rolling bearing device 1 according to the embodiment (hereinafter sometimes referred to as "the bearing device 1") is housed in a housing 3 disposed at an end portion of a railway axle (rotary shaft) 2. The housing 3 is fixed to an underframe of a railway bogie (not illustrated), for example. The housing 3 according to the embodiment includes a cylindrical axle box 3a, a first cover 3b that covers an opening on one axial end of the axle box 3a, and a second cover 3c that covers an opening on the other axial end of the axle box 3a, for example.

The bearing device 1 includes a rolling bearing 10 that supports the axle such that the axle 2 is rotatable about a horizontal axis relative to the housing 3. The rolling bearing 10 includes two inner rings 11, an outer ring 12, a plurality of tapered rollers (rolling elements) 13 disposed in an annular space K between the inner rings 11 and the outer ring 12, and cages 14 that hold the tapered rollers 13. The inner rings 11 are fitted onto and fixed to the end portion of the axle 2 and include a pair of inner ring components 11a arranged side by side to each other in an axial direction. Inner ring raceways 11b on which the tapered rollers 13 roll are formed on outer circumferential surfaces of each of the inner ring components 11a.

The inner rings 11 are disposed between a nut 15 located close to an axial end of the axle 2 (left side in FIG. 1) and an annular member 16 located away from the axial end of the axle 2 (right side in FIG. 1). The annular member 16 is fitted onto and fixed to an outer circumferential surface of the axle 2 away from the axial end. The nut 15 is screwed onto an external thread 2a formed on the outer circumference of the axle 2 close to the axial end and fastened with a predetermined tightening torque. A locking ring 17 that keeps the nut 15 from loosening is fitted onto and fixed to the axle 2 at a position closer to the axial end of the axle 2 than the nut 15 is. The locking ring 17 is fixed to the nut 15 with a bolt (not illustrated). This causes the inner rings 11 to be sandwiched between the nut 15 and the annular member 16, limiting axial movement of the inner rings 11. The locking ring 17 includes, on its inner circumference, a plurality of projections 17a projecting radially inward. Each of the projections 17a is inserted into one of a plurality of grooves 2b provided in the axle 2. Circumferential movement of the locking ring 17 is limited by the plurality of projections 17a each inserted into one of the plurality of grooves 2b.

The outer ring 12 is fitted into and fixed to an inner circumferential surface of the axle box 3a at a position radially outside the inner rings 11. Outer ring raceways 12b, each facing one of the inner ring raceways 11b of the inner rings 11, are formed on an inner circumferential surface of the outer ring 12. The outer ring 12 according to the embodiment is a double-row outer ring having the inner circumferential surface on which the outer ring raceways 12b are formed in two rows. Two rows (double-row) of the tapered rollers 13 are disposed between the outer ring raceways 12b of the outer ring 12 and the inner ring raceways 11b of the inner rings 11 such that the tapered rollers 13 can roll therebetween. The tapered rollers 13 of each row are held by the cage 14 at predetermined intervals in a circumferential direction of the cage 14. Thus, the rolling bearing 10 according to the embodiment is a double-row tapered roller bearing.

An oil pocket 4 for storing lubricating oil is provided in a vertically lower portion of the housing 3. The oil pocket 4 according to the embodiment is provided by recessing a portion of an inner circumferential surface 3a1 of a vertically lower end portion of the axle box 3a to a level below an outer circumferential surface 12a of the outer ring 12. The recessed portion is axially closer to the axial end of the rolling bearing 10 than a seal 6 disposed between an inner circumferential surface of the second cover 3c and an outer circumferential surface of the annular member 16 is. Lubricating oil is stored in the oil pocket 4 such that the rolling bearing 10 is partially submerged in the lubricating oil to a level corresponding to a part, in a circumferential direction, of the annular space K when the axle 2 is stationary. As illustrated in FIG. 1, an oil level of the lubricating oil stored in the oil pocket 4 is vertically above openings K1 that are on axially opposite sides of a vertically lowermost portion of the annular space K when the axle 2 is stationary.

An oil drain hole 7 through which lubricating oil stored in the oil pocket 4 is to be drained radially extends through a vertically lowermost portion of the axle box 3a. A magnetic plug 8 that can open and close the oil drain hole 7 is attached to the oil drain hole 7. A distal end surface 8a of the magnetic plug 8 serves as an attracting surface that magnetically attracts foreign materials, such as iron powder, contained in the lubricating oil. This allows easy removal of foreign material from the lubricating oil by removing the magnetic plug 8 from the oil drain hole 7. An oil sight window (not illustrated) is provided in a vertically lower end portion of the housing 3. The lubricating oil stored in the oil pocket 4 is visually accessible through the oil sight window. A condition of the lubricating oil is thus monitored.

Figure 2:
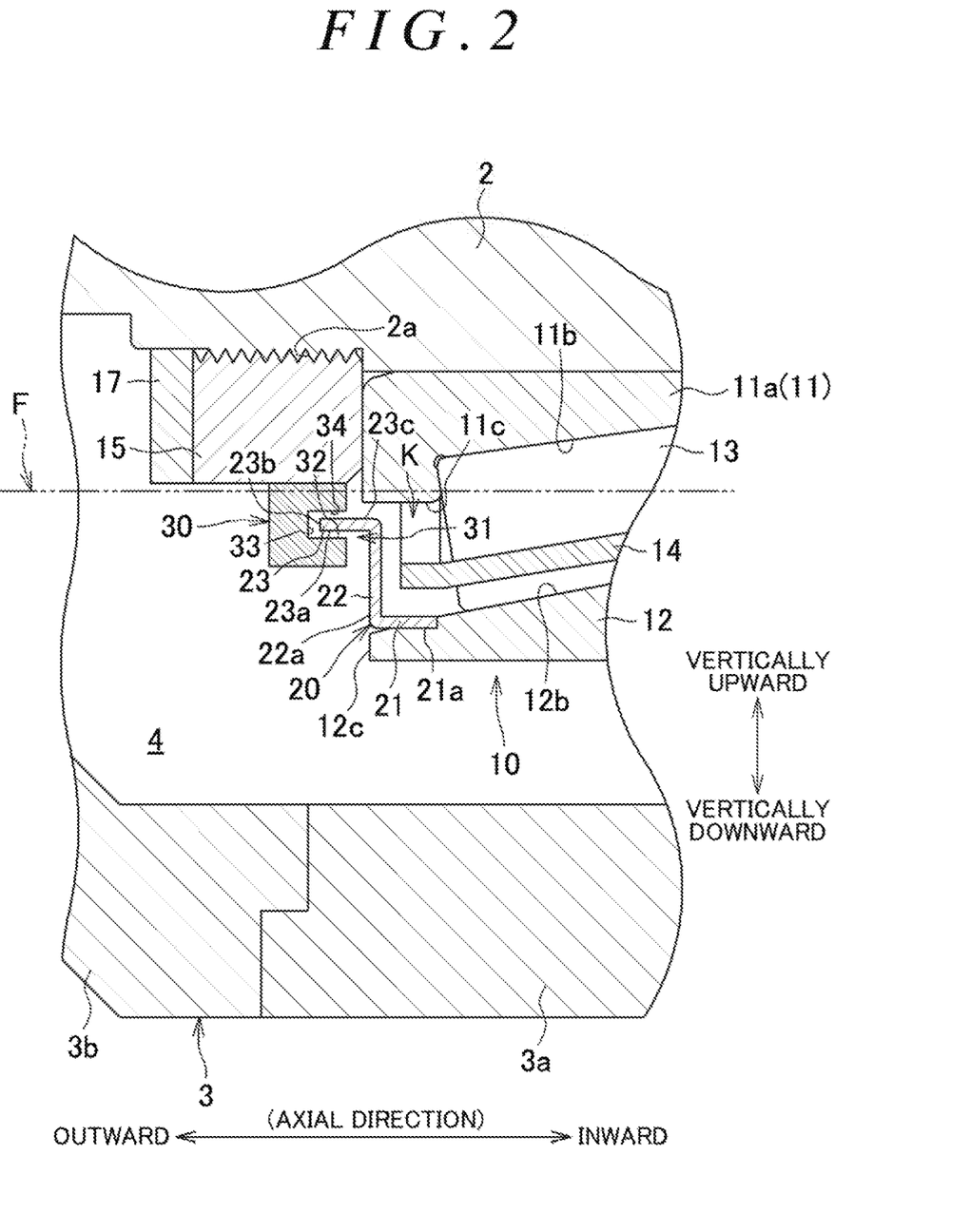
FIG. 2 is an enlarged sectional view of FIG. 1, illustrating an axial end portion of a rolling bearing.

The bearing device 1 includes a pair of annular shielding members 20 and a pair of annular seal components 30 disposed nit opposite ends in the axial direction of the rolling bearing 10. FIG. 2 is an enlarged sectional view of FIG. 1, illustrating an axial end portion of the rolling bearing 10. Note that the shielding member 20 and the seal component 30 disposed on the axial end portion of the rolling bearing 10 and the shielding member 20 and the seal component 30 disposed away from the axial end portion of the rolling bearing 10 are identical in configuration. Only the shielding member 20 and the seal component 30 disposed on the axial end portion are described below. Hereinafter, directions (leftward in the example of FIG. 2) from a center in the axial direction of the rolling bearing 10 toward the opposite ends in the axial direction of the rolling bearing 10 are referred to as axially outward (axially outside), and directions (rightward in the example of FIG. 2) from the opposite ends in the axial direction of the rolling bearing 10 toward the center in the axial direction are referred to as axially inward (axially inside).

As illustrated in FIG. 2, the shielding member 20 includes an outer circumferential portion fixed to the outer 12 at a position axially outside the annular space K and externally covers the annular space K in the axial direction. The shielding member 20 according to the embodiment includes an outer cylindrical portion 21, a ring portion 22, and an inner cylindrical portion 23. The outer cylindrical portion 21 is fined into and fixed to an outer axial end portion of the outer ring 12. The ring portion extends radially inward from an outer axial end of the outer cylindrical portion 21. The inner cylindrical portion 23 extends axially outward from an inner periphery of the ring portion 22. The outer cylindrical portion 21, the ring portion 22, and the inner cylindrical portion 23 are integrated with one another.

An annular surface 22a of the ring portion 22 is positioned slightly axially outward relative to an outer side surface 12c of the outer ring 12. Accordingly, the inner cylindrical portion 23 of the shielding member 20 projects axially outward relative to the rolling bearing 10. An inner circumferential surface 23c of the inner cylindrical portion 23 is larger in diameter than an outer circumferential surface 11c of a cone back face rib formed on an axially outer portion of the inner ring component 11a. The shielding member 20 thus allows lubricating oil that has passed through a labyrinth seal, which is described later, to flow into the annular space K through an area between the inner circumferential surface 23c and the outer circumferential surface 11c. Although the outer cylindrical portion 21 is fixed to the outer ring 12 in this example, the outer cylindrical portion 21 may alternatively be directly fixed to the housing 3 or may be fixed to a member fixed to the housing 3 other than the outer ring 12.

The seal component 30 is fitted onto and fixed to the nut 15 at a position axially outside the shielding member 20. The seal component 30 reduces entry of the lubricating oil into the annular space K (inside the rolling bearing 10) from inside the oil pocket 4. The seal component 30 according to the embodiment has an annular groove 31 that is open axially inward and has a U-shaped sectional profile. Although the seal component 30 is fitted onto and fixed to the nut 15 in this example, the seal component 30 may alternatively be fixed to the nut 15 using other fixing means, such as a bolt. Although the seal component 30 is fixed to the nut 15 in this example, the seal component 30 may alternatively be fixed to at least one of the axle 2, the inner ring 11, and a member fixed to the axle 2 other than the inner ring 11.

The annular groove 31 of the seal component 30 is shaped such that the inner cylindrical portion 23 of the shielding member 20 is inserted into the annular groove 31 out of contact with the annular groove 31. More specifically, an outer circumferential surface 32 of the annular groove 31 is slightly larger in diameter than an outer circumferential surface 23a of the inner cylindrical portion 23. A bottom surface 33 of the annular groove 31 is shaped so as to be located slightly axially outward relative to an outer axial end surface 23b of the inner cylindrical portion 23. An inner circumferential surface 33 of the annular groove 31 is slightly smaller in diameter than the inner circumferential surface 23c of the inner cylindrical portion 23.

According to the configuration described above, a micro clearance is provided in each of an area between the outer circumferential surface 32 of the annular groove 31 and the outer circumferential surface 23a of the inner cylindrical portion 23, an area between the bottom surface 33 of the annular groove 31 and the end surface 23b of the inner cylindrical portion 23, and an area between the inner circumferential surface 34 of the annular groove 31 and the inner circumferential surface 23c of the inner cylindrical portion 23 such that the micro clearances are continuous with each other. The micro clearances serve as a labyrinth seal. In other words, the labyrinth seal is formed between an inner circumferential portion (the inner cylindrical portion 23) of the shielding member 20 and the annular groove 31 of the seal component 30 throughout a perimeter of the inner circumferential portion and the annular groove 31. In the embodiment, a lowermost end portion of the labyrinth seal is located below the oil level F of the lubricating oil. The labyrinth seal may be otherwise structured.

Figure 3:
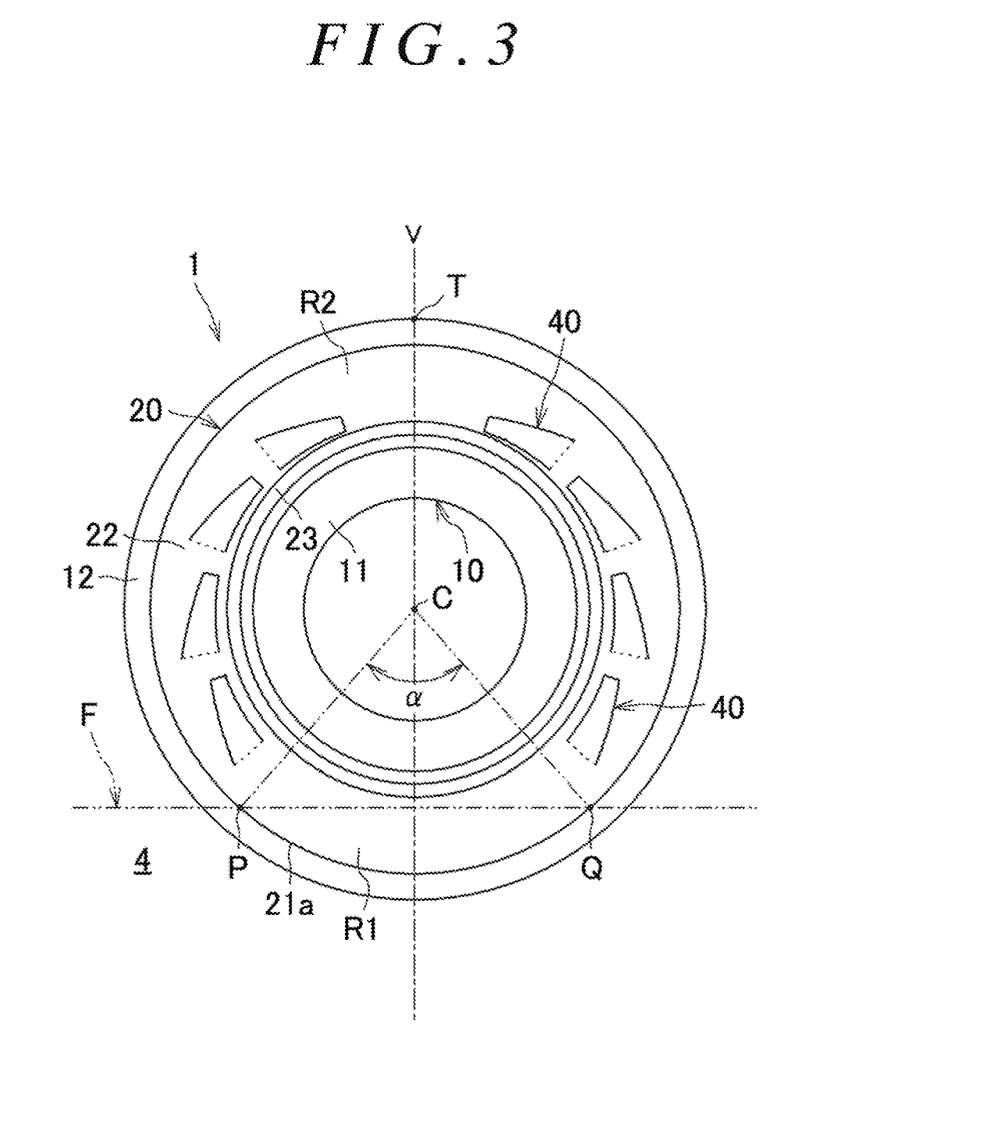
FIG. 3 is a from view illustrating the rolling bearing device as viewed front a point facing an axial end of the rolling bearing device.
Figure 4:
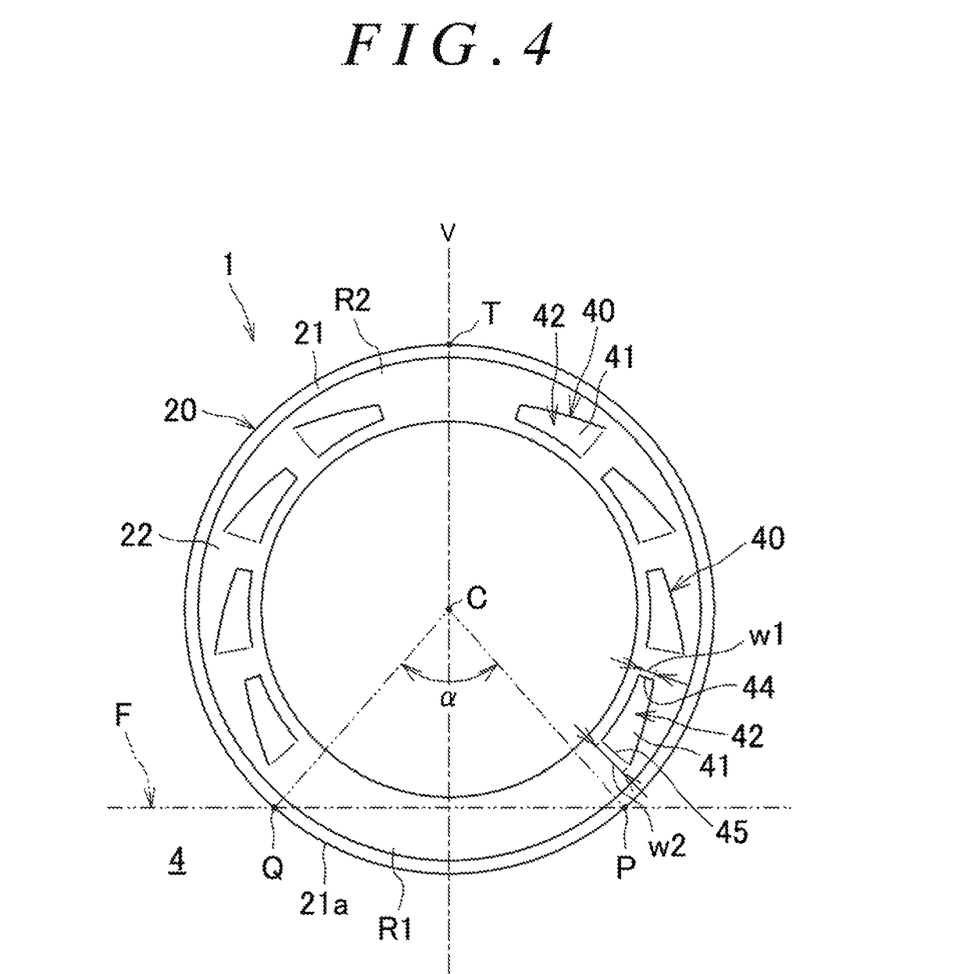
FIG. 4 is a front view illustrating a shielding member of the rolling bearing device illustrated in FIG. 3, as viewed in a direction opposite to a viewing direction of FIG. 3.
Figure 5:
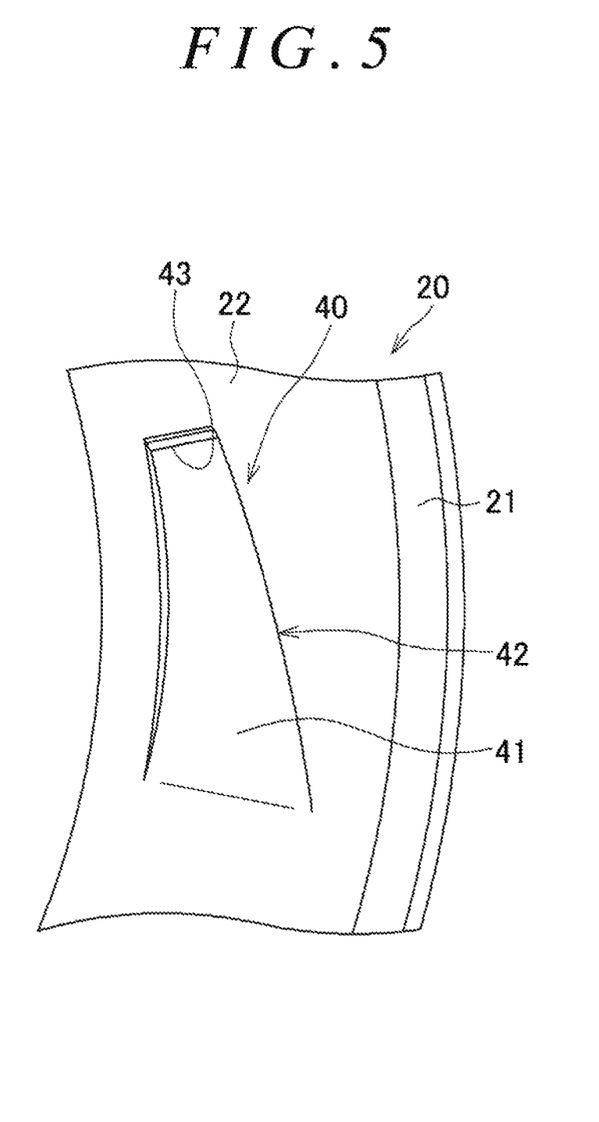
FIG. 5 is an explanatory perspective view illustrating a part of the shielding member illustrated in FIG. 4, as viewed from inside the rolling bearing.
Figure 6:
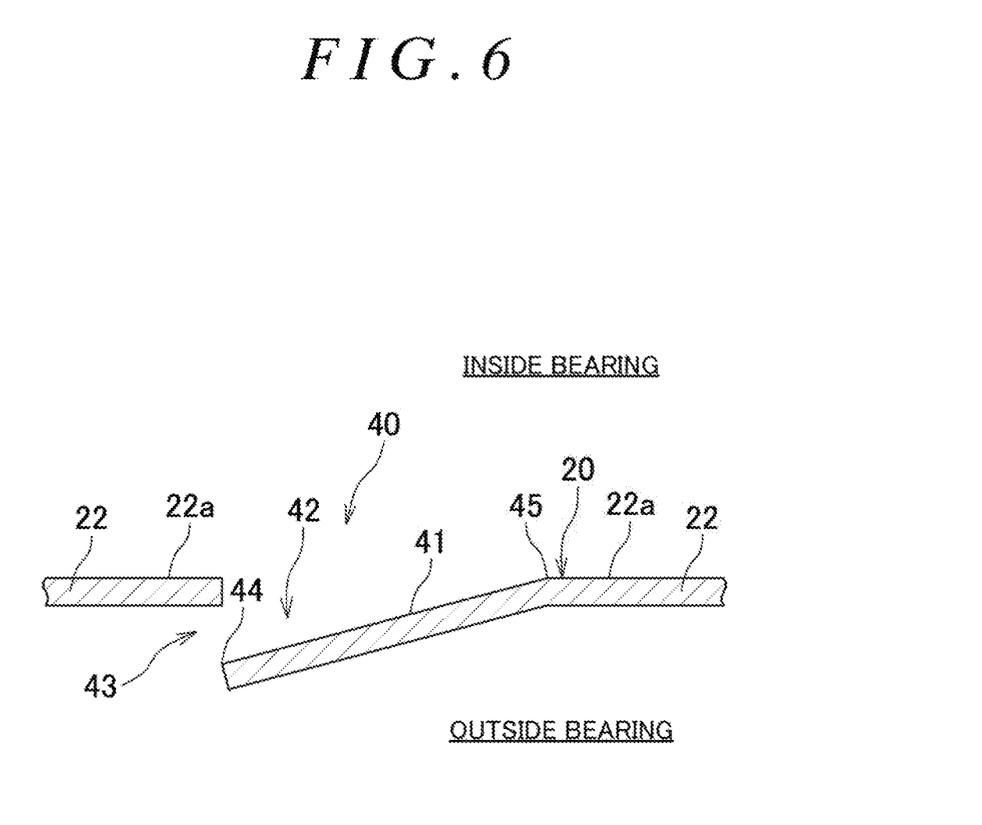
FIG. 6 is an explanatory sectional view illustrating an oil drain portion of the shielding member illustrated in FIG. 5.

FIG. 3 is a front view illustrating the rolling bearing device 1 as viewed from a point facing the axial end the rolling bearing device 1. FIG. 4 is a front view illustrating the shielding member 20 as viewed in a direction opposite to a viewing direction of FIG. 3. FIG. 5 is an explanatory perspective view illustrating a part of the shielding member 20 illustrated in FIG. 4, as viewed from inside the rolling bearing 10 (hereinafter sometimes simply referred to as "inside the bearing"). The seal component 30 is omitted in FIG. 3 for clarity. A plurality of (in the embodiment eight) oil drain portions 40 is provided in the ring portion 22 of the shielding member 20 along a circumferential direction of the ring portion 22. Each of the oil drain portions 40 has an inclined groove 42 and an opening 43. The inclined groove 42 has an inclined surface 41 that is inclined away from the rolling bearing 10 (in FIG. 3, toward a near side of the paper plane; in FIG. 4, toward a far side of the paper plane) with increasing vertical position. The opening 43 is defined in an outer end portion 44 (see FIG. 6) at a distal end of the inclined surface 41. The number of the oil drain portions 40 is not limited to any particular number, and may be smaller than seven or larger than nine.

All the oil drain portions 40 in the ring portion 22 are provided at a vertical level above the oil level F of the lubricating oil stored in the oil pocket 4. None of the oil drain portions 40 is provided at a vertical level equal to or below the oil level F. In the embodiment, in the front view of the bearing device 1, two intersections between an outer circumferential surface 21a (see also FIG. 2) of (the outer cylindrical portion 21 of) the shielding member 20 and the oil level F of the lubricating oil are individually denoted by P and Q. An axis of the rolling bearing 10 is denoted by C. In this case, none of the oil drain portions 40 is provided in a region R1 within an angular range of α of the ring portion 22, where α is an angle between an imaginary line C-P connecting the axis C and the intersection P and an imaginary line C-Q connecting the axis C and the intersection Q. More specifically, in the embodiment, in the front view of the bearing device 1, all the oil drain portions 40 are provided in a region R2 within an angular range of (360-α)° about the axis C of the ring portion 22.

In a front view as viewed in the axial direction of the axle 2, the eight oil drain portions 40 are arranged in bilateral symmetry in other words, in a front view as viewed in the axial direction of the axle 2, the eight oil drain portions 40 are arranged in line symmetry with respect to a vertical line V extending through the axis C. The axle 2 according to the embodiment rotates bidirectionally, forward or backward. The eight oil drain portions 40 are arranged in bilateral symmetry so that the lubricating oil in the annular space K can be returned to the oil pocket 4 irrespective of the direction in which the axle 2 rotates.

The inclined surface 41 of each of the oil drain portions 40 is inclined away from the rolling bearing 10. A rectangular opening 43 that connects between inside the bearing (the annular space K) and outside the rolling bearing 10 (hereinafter sometimes simply referred to as "outside the bearing") is defined in the outer end portion 44 at the distal end of the surface 41.

When viewed in the axial direction, the inclined groove 42 is tapered toward a vertical top of the annular shielding member 20 with the shielding member 20 assembled onto the rolling bearing device 1. A radial length of the opening 43 is equal to a groove width w1 of the outer end portion 44 of the inclined groove 42. A groove width w2 of an inner end portion 45 at a basal end of the inclined groove 42 is larger than the groove width w1 because the inclined groove 42 is tapered as described above. Shaping the inclined groove 42 in the tapered form when viewed in the axial direction allows reducing the opening 43 in size as compared to the case where the shape of the inclined groove 42 is not tapered. According to the embodiment, when viewed in the axial direction, the inclined groove 42 is tapered such that a distance from an inner periphery or an inner circumference of the annular shielding member 20 decreases toward the vertical top of the shielding member 20 as illustrated in FIGS. 4 and 5.

In the rolling bearing device 1 configured as described above, lubricating oil that has flowed into the bearing from the oil pocket 4 through the labyrinth seal is lifted up to a vertical level above the oil level F of the lubricating oil by rotation of the tapered rollers 13 and the inner rings 11 of the rolling bearing 10. This causes the lubricating oil to flow along the surfaces 41 of the inclined grooves 42 of the oil drain portions 40, be drained to the outside of the bearing through the openings 43 of the oil drain portions 40, and return to the oil pocket 4. Thus, agitating the lubricating oil by circulating the lubricating oil between inside the bearing and outside the bearing is achieved. A force in the rotating direction and toward outside the bearing is applied to the lubricating oil that is lifted vertically upward by rotation of the tapered rollers 13 and the inner rings 11. This force moves the lubricating oil adhering to the surfaces 41 of the inclined grooves 42 toward the openings 43 (in the rotating direction) while pressing the lubricating oil against the surfaces 41, draining the lubricating oil to the outside of the bearing through the openings 43.

The lubricating oil lifted up by rotation of the axle 2 and adhering to an inner circumferential surface of the housing 3 outside the bearing may return or flow backward into the bearing through the openings 43 of the oil drain portions 40. However, according to the embodiment, the groove width of the inclined groove 42 gradually decreases toward the vertical top of the shielding member 20. Accordingly, the size of the opening 43 defined in the outer end portion 44 of the inclined surface 41 is smaller than that of a configuration in which a groove width of an inclined groove is uniform. Hence, return or a backward flow of lubricating oil into the bearing through the openings 43 can be reduced. The inclined groove 42 is tapered such that the distance from the inner periphery or the inner circumference of the shielding member 20 decreases toward the vertical top. This suppresses return of lubricating oil adhering to the ring portion 22 of the shielding member 20 into the bearing through the openings 43 of the oil drain portions 40 with the lubricating oil subjected to a centrifugal force.

The bearing device 1 according to the embodiment is configured as follows. In a position axially outside the annular space K between the inner rings 11 and the outer ring 12 of the rolling bearing 10, the outer circumferential portion (the outer cylindrical portion 21) of the shielding member 20 is fixed indirectly to the housing 3, and the labyrinth seal is formed between the inner circumferential portion (the inner cylindrical portion 23) of the shielding member 20 and the annular groove 31 of the seal component 30 that is fixed indirectly to the axle 2. This can reduce entry of lubricating oil into the annular space K (inside the bearing) from inside the oil pocket 4 provided in the vertically lower portion of the housing 3. The shielding member 20 has the plurality of oil drain portions 40 along the circumferential direction at a vertical level above the oil level F of the lubricating oil stored in the oil pocket 4 when the axle 2 is stationary. Lubricating oil that has flowed into the annular space K from the oil pocket 4 is lifted up to a vertical level above the oil level F by rotation of the tapered rollers 13 and the inner rings 11 of the rolling bearing 10. Accordingly, the lubricating oil is drained to the outside of the bearing through the openings 43 of the oil drain portions 40 and returns to the oil pocket 4. Thus, entry of the lubricating oil into the annular space K is limited. Furthermore, even when the lubricating oil should flow into the annular space K, the lubricating oil can be drained to the outside of the bearing. According to the embodiment, because the openings 43 are relatively small in size, return of the lubricating oil from outside the bearing to the annular space K through the openings 43 is reduced. This at least reduces accumulation of excess lubricating oil in the annular space K. As a result, agitation of lubricating oil resulting from rotation of the rolling bearing 10 is reduced, and a temperature rise of the rolling bearing device 1 caused by the agitation of lubricating oil can be reduced.

Figure 7:
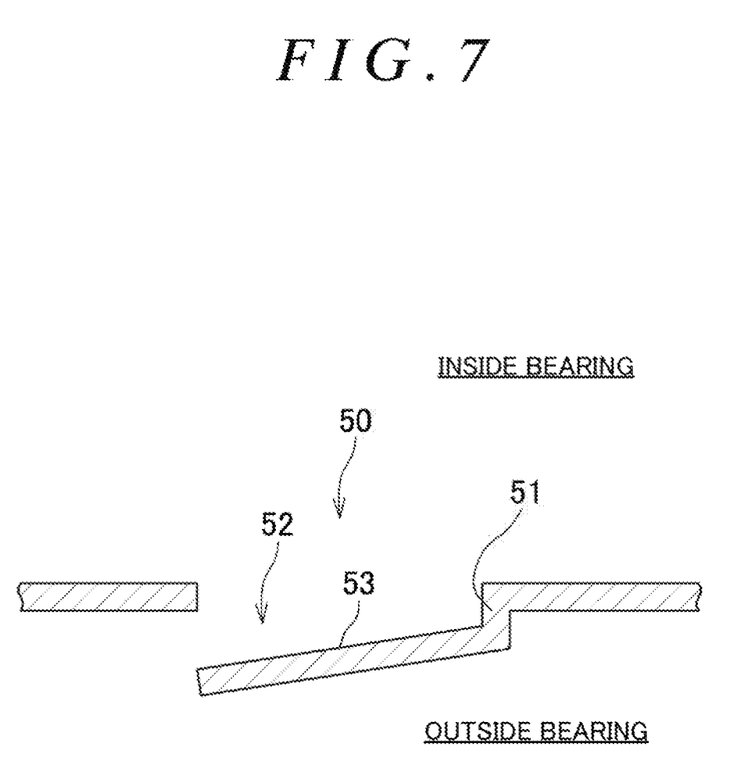
FIG. 7 is an explanatory sectional view illustrating a modification of the oil drain portion.

The disclosed embodiment is in every aspect illustrative and not restrictive. More specifically, a rolling bearing device of the invention is not limited to the illustrated embodiment, and the invention may be embodied otherwise within the scope of the invention. For instance, according: to the embodiment described above, the surface 41 of the inclined groove 42 of the oil drain portion 40 is continuous with the annular surface 22a that is an inner portion of the ring portion 22 of the shielding member 20. Alternatively as illustrated in FIG. 7, an inclined surface 53 of an inclined groove 52 may be provided as follows. A step portion 51 that projects toward outside the bearing is provided on an end portion of an oil drain portion 50 circumferentially away from a top portion T (see FIGS. 3 and 4) of the shielding member 20. The inclined surface 53 extends from an outer distal end of the step portion 51.

Figure 8:
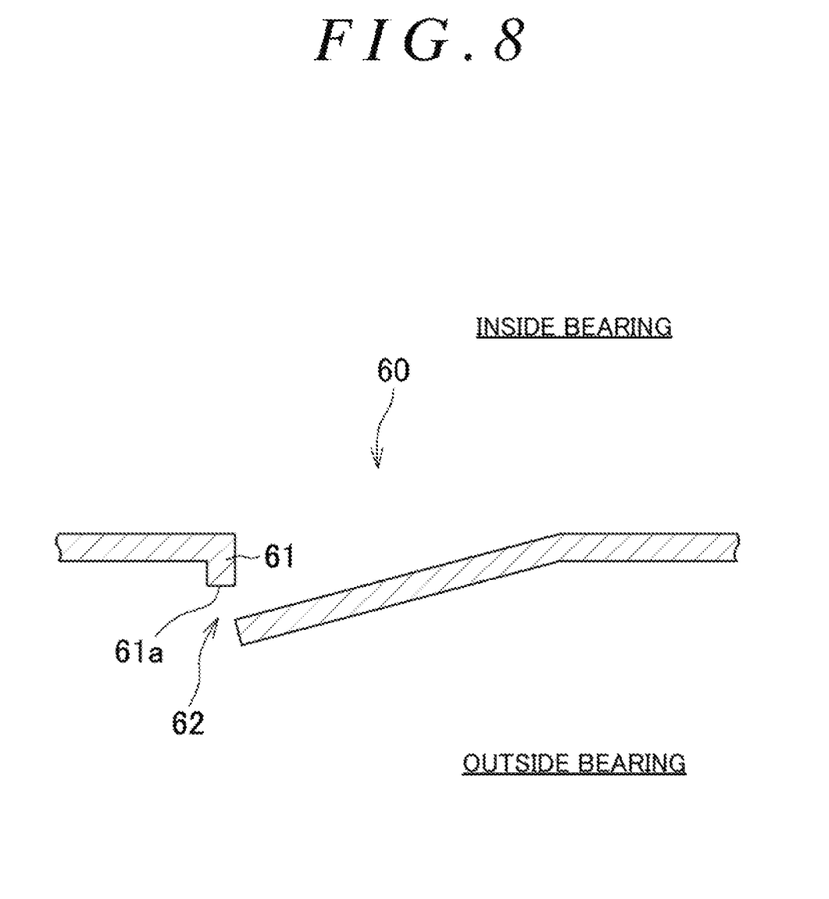
FIG. 8 is an explanatory sectional view illustrating another modification of the oil drain portion.
Figure 9:
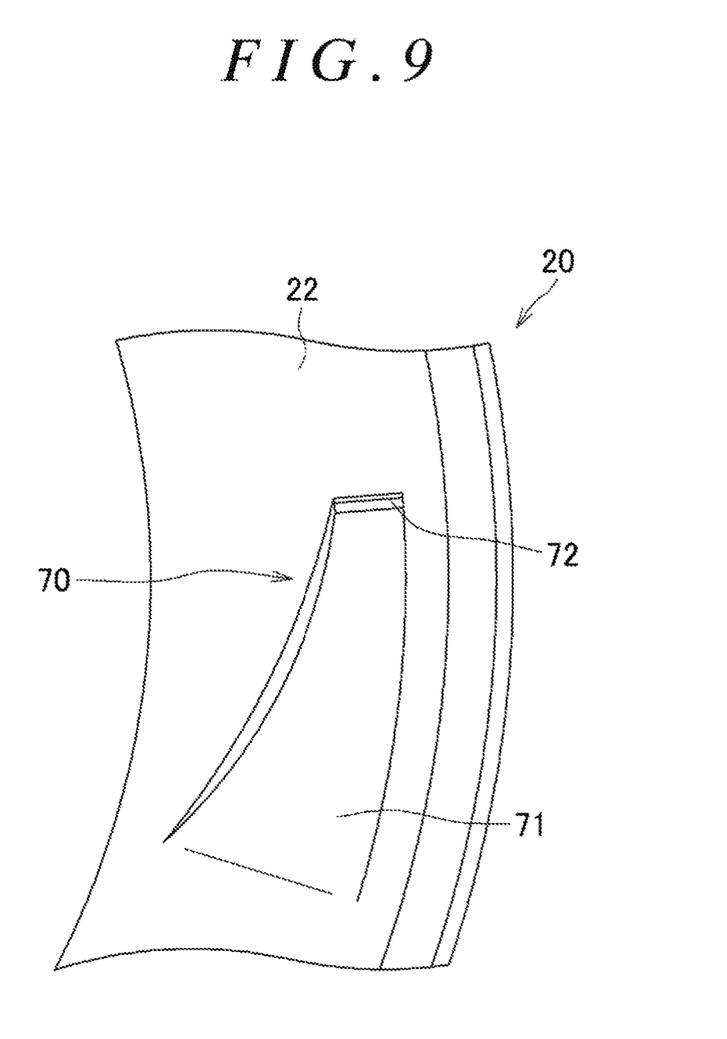
FIG. 9 is an explanatory perspective view illustrating still another modification of the oil drain portion.

Further alternatively, as illustrated in FIG. 8, a hanging wall 61 projecting toward outside the bearing may be provided on an end portion of an oil drain portion 60 circumferentially close to the top portion T of the shielding member 20. An opening 42 may be defined by an edge 61a on a distal end of the hanging wall 6. The inclined groove 42 according to the embodiment described above is tapered such that the distance from the inner periphery or the inner circumference of the shielding member 20 decreases toward the vertical top of the shielding member 20 (when viewed in the axial direction). Alternatively, an inclined groove 70 may be tapered such that a distance from an outer periphery or an outer circumference of the shielding member 20 decreases toward the vertical top of the shielding member 20 as illustrated in FIG. 9. The lubricating oil lifted vertically upward by rotation of the tapered rollers 13 and the inner rings 11 is subjected to a centrifugal force. By tapering the inclined groove 70 such that the distance from the outer periphery or the outer circumference decreases, the lubricating oil can be efficiently moved toward an opening 72 along an inclined surface 71 of the inclined groove 70.

Although the embodiment has described an example in which the rolling bearing 10 is a double-raw tapered roller bearing a type of the beating is not limited thereto, and may alternatively be a deep groove ball bearing or a cylindrical roller bearing, for example. Although the embodiment has described an example in which the rolling bearing device 1 of the invention is disposed in a railway axle, the rolling bearing device 1 is applicable to other equipment.

According to the invention, a temperature rise of a rolling bearing device caused by agitation of lubricating oil can be reduced.

What is claimed is:
1. A rolling bearing device comprising:
a rolling bearing that is housed in a housing and supports a rotary shaft such that the rotary shaft is rotatable about a horizontal axis relative to the housing,
the rolling bearing including a plurality of inner rings fixed to the rotary shaft, an outer ring fixed to the housing, and a plurality of rolling elements disposed in an annular space between the inner rings and the outer ring,
the rolling bearing being partially submerged in lubricating oil stored in an oil pocket provided in a vertically lower portion of the housing;
an annular shielding member that includes an outer circumferential portion fixed to the outer ring and externally covers the annular space in an axial direction; and
an annular seal component that is fixed to a member fixed to the rotary shaft and reduces entry of the lubricating oil into the annular space from the oil pocket by forming a labyrinth seal between an inner circumferential portion of the shielding member and the annular seal component, wherein
the shielding member has an oil drain portion for drainage of the lubricating oil in the annular space to the outside of the rolling bearing, the oil drain portion being provided at a vertical level above an oil level of the lubricating oil stored in the oil pocket when the rotary shaft is stationary,
the oil drain portion has an inclined groove and an opening, the inclined groove having an inclined surface inclined away from the rolling bearing, the opening being provided in an outer end portion at a distal end of the inclined surface, and
the inclined groove is tapered toward a vertical top of the annular shielding member when viewed in the axial direction.
2. The rolling bearing device according to claim 1, wherein a radially outer wall of the inclined groove tapers toward an inner periphery of the annular shielding member such that a distance from the inner periphery of the annular shielding member decreases toward a vertical top of the shielding member when viewed in the axial direction.

* * * * *